US008805917B2

(12) United States Patent
Mohamed et al.

(10) Patent No.: US 8,805,917 B2
(45) Date of Patent: *Aug. 12, 2014

(54) PARALLEL REDUNDANT DECIMAL FUSED-MULTIPLY-ADD CIRCUIT

(75) Inventors: Amira Mohamed, Cairo (EG); Ramy Raafat, Cairo (EG); Hossam Ali Hassan Fahmy, Cairo (EG); Tarek Eldeeb, Cairo (EG); Yasmeen Farouk, Cairo (EG); Rodina Samy, Cairo (EG); Mostafa Elkhouly, Cairo (EG)

(73) Assignee: SilMinds, LLC, Egypt, Cairo (EG)

( * ) Notice: Subject to any disclaimer, the term of this patent is extended or adjusted under 35 U.S.C. 154(b) by 496 days.

This patent is subject to a terminal disclaimer.

(21) Appl. No.: 13/177,491

(22) Filed: Jul. 6, 2011

(65) Prior Publication Data

US 2012/0011187 A1 Jan. 12, 2012

Related U.S. Application Data

(60) Provisional application No. 61/361,550, filed on Jul. 6, 2010.

(51) Int. Cl.
*G06F 7/48* (2006.01)

(52) U.S. Cl.
USPC .......................................................... 708/523

(58) Field of Classification Search
None
See application file for complete search history.

(56) References Cited

U.S. PATENT DOCUMENTS

| 5,659,495 | A  | * | 8/1997  | Briggs et al. ................ | 708/523 |
| 7,136,893 | B2 |   | 11/2006 | Carlough et al. | |
| 8,577,952 | B2 | * | 11/2013 | Erle et al. .................... | 708/624 |
| 2010/0146030 | A1 | * | 6/2010 | Erle et al. .................... | 708/624 |
| 2012/0011181 | A1 | * | 1/2012 | Samy et al. .................. | 708/204 |
| 2012/0011187 | A1 | * | 1/2012 | Mohamed et al. ........... | 708/523 |

OTHER PUBLICATIONS

Wang, Liang-Kai and Schulte, M.J., "Decimal Floating-Point Square Root Using Newton-Raphson Iteration," Application-Specific Systems, Architecture Processors (ASAP), 2005, 16th IEEE International Conference, Jul. 2005, 7 pages.

* cited by examiner

*Primary Examiner* — David H Malzahn
(74) *Attorney, Agent, or Firm* — Osha Liang LLP (57) ABSTRACT

A circuit for performing a floating-point fused-multiply-add (FMA) calculation of $a \times b \pm c$. The circuit includes (i) a partial product generation module having (a) a multiples generator unit configured to generate multiples of a multiplicand has m digit binary coded decimal (BCD) format, (b) a recoding unit configured to generate n+1 signed digits (SD) sets from a sum vector and a carry vector of a multiplier, and (c) a multiples selection unit configured to generate partial product vectors from the multiples of the multiplicand based on the n+1 SD sets and the sign of FMA calculation, and (ii) a carry save adder (CSA) tree configured to add the partial product vectors and an addend to generate a result sum vector and a result carry vector in a m+n digit BCD format.

20 Claims, 5 Drawing Sheets

PARALLEL REDUNDANT DECIMAL FUSED-MULTIPLY-ADD CIRCUIT

CROSS-REFERENCE TO RELATED APPLICATIONS

This application is a non-provisional patent application of U.S. Provisional Patent Application No. 61/361,550, filed on Jul. 6, 2010, and entitled: "A Parallel Redundant Decimal Fused-Multiply-Add Unit." Accordingly, this non-provisional patent application claims priority to U.S. Provisional Patent Application No. 61/361,550 under 35 U.S.C. §119(e). U.S. Provisional Patent Application No. 61/361,550 is hereby incorporated in its entirety.

BACKGROUND

Decimal arithmetic has a growing need in many commercial, financial, billing applications and database systems where binary arithmetic is not sufficient. The arithmetic operations in such applications need to be executed in decimal to attain required accuracy. This is due to the inexact mapping between certain decimal and binary numbers. Moreover, decimal arithmetic is the norm of human calculations. The decimal division and decimal square-root operations are the most complex operations among decimal operations. They need many cycles to be executed accurately.

SUMMARY

In general, in one aspect, the invention relates to a circuit for performing a floating-point fused-multiply-add (FMA) calculation. The circuit includes (i) a partial product generation module having (a) a multiples generator unit configured to generate a plurality of multiples of a multiplicand for the decimal FMA calculation, wherein the multiplicand is in a m digit binary coded decimal (BCD) format (b) a recoding unit configured to generate n+1 signed digits (SD) sets from a multiplier sum vector and a multiplier carry vector of a multiplier for the decimal FMA calculation, and (c) a multiples selection unit configured to generate a plurality of partial product vectors from the plurality of multiples of the multiplicand based on the n+1 SD sets and the sign of FMA calculation, and (ii) a carry save adder (CSA) tree coupled to the partial product generation unit and configured to add the plurality of partial product vectors and an addend for the FMA calculation to generate a result sum vector and a result carry vector in a m+n digit BCD format, wherein the FMA calculation comprises a calculation of a×b±c, where a represents the multiplicand, b represents the multiplier, c represents the addend, × represents a multiplication operator, and ± represents one of an addition operator and a subtraction operator.

In general, in one aspect, the invention relates to a method for performing a floating-point fused-multiply-add (FMA) calculation. The method includes generating a plurality of multiples of a multiplicand for the decimal FMA calculation, wherein the multiplicand is in a m digit binary coded decimal (BCD) format, generating n+1 signed digits (SD) sets from a multiplier sum vector and a multiplier carry vector of a multiplier for the decimal FMA calculation, generating a plurality of partial product vectors from the plurality of multiples of the multiplicand based on the n+1 SD sets and the sign of FMA calculation, and adding the plurality of partial product vectors and an addend for the FMA calculation to generate a result sum vector and a result carry vector in a m+n digit BCD format, wherein the FMA calculation comprises a calculation of a×b±c, where a represents the multiplicand, b represents the multiplier, c represents the addend, × represents a multiplication operator, and ± represents one of an addition operator and a subtraction operator.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a circuit and method to perform redundant decimal fused-multiply-add (FMA) calculations that improve speed performance and result accuracy by eliminating the truncation of an intermediate result between the multiplication and addition operations. Embodiments of the invention support signed decimal multiplications and additions applicable to various iterative multiplicative algorithms. For example, the multiplier input and calculation output of the FMA circuit are in a redundant format, also referred to as a carry save (CS) format, that includes a sum vector and a carry vector each having a number of digits in binary coded decimal (BCD) format. Such input/output configurations advantageously accelerate an iterative algorithm performed using the redundant decimal FMA circuit, such as the Newton-Raphson iteration or other iterative multiplicative algorithm where each iteration includes one or more multiplication(s) or, more generally, one or more FMA calculation(s). In one or more embodiments, the partial products of each multiplication are calculated in parallel and added using a carry save adder (CSA) tree. The addend of the FMA calculation is injected as another partial product to generate the FMA calculation output. In one or more embodiments, a logic module is configured to provide the initial multiplicand, multiplier, and addend of the FMA calculation for the initial iteration and to provide subsequent multiplicands, multipliers, and addends for subsequent iterations. In one or more embodiments, the initial input is determined based on parameter(s) in a mathematical formula that is computed using the iterative algorithm. In one or more embodiments, the subsequent multipliers are obtained by feedback. In one or more embodiments, the logic module generates the multiplier for each subsequent iteration without truncating the digit-width of the FMA calculation output to reduce truncation errors that cumulate through the iterations. In one or more embodiments, the un-truncated multiplier in the redundant CS format is recoded into redundant signed digits sets for generating the partial products. Such recoding incorporates carry propagation from adding the least significant digits of the sum vector and carry vector in the un-truncated multiplier to improve accuracy of the final result of the iterative algorithm. In one or more embodiments, the multiplicand, multiplier, and addend are fixed point integers.

As noted above, the Newton-Raphson approximation is an iterative method that is used to refine the initial divisor reciprocal (1/B) to be multiplied by the dividend (A) and obtain the quotient (Q). Also it is used to refine the initial square-root reciprocal $$\frac{1}{(\sqrt{R})}$$

to be multiplied by the input radicand (R) and obtain the square-root (SQRT) of an input radicand. The division and square-root operations are shown in the equations below.

$$Q = \frac{A}{B} = A \times \frac{1}{B}$$

$$SQRT = \sqrt{R} = R \times \frac{1}{\sqrt{R}}$$

In general, the Newton-Raphson iterative method is used to obtain the root of a non-linear function f(x). Those skilled in the art, having the benefit of this detailed description, will appreciate that the Newton-Raphson result at iteration i+1 is:

$$X_{i+1} = X_i - \frac{f(X_i)}{f'(X_i)}$$

For example, decimal division may be iteratively calculated based on the non-linear function, $$f(X) = \frac{1}{X} - B$$

$$X_{i+1} = X_i \times (2 - B \times X_i)$$

Where the root of f(x) is x=1/B and $X_i$ is the approximated value (referred to as the approximated reciprocal) of the reciprocal 1/B in the $i^{th}$ iteration.

In another example, square-root calculation may be iteratively calculated based on the non-linear function, $$f(X) = \frac{1}{X^2} - B$$

$$X_{i+1} = \frac{X_i}{2}(3 - B \times X_i^2) = X_i\left(1.5 - \frac{B}{2} \times X_i^2\right)$$

Where the root of f(x) is X=1/√B and $X_i$ is the approximated value (referred to as the approximated square-root reciprocal) of the square-root reciprocal 1/√B in the $i^{th}$ iteration.

In summary, the Newton-Raphson iteration for a division or a square-root calculation may be recursively executed using the sequence of operations shown in TABLE 1 (below). Specifically, each calculation in the sequence of calculations shown in TABLE 1 is referred to as a stage. In particular, the first calculation and the third calculation in the sequence is a multiplication calculation, which is a special case of the FMA calculation. As shown, i represents the index of the iteration that serializes the FMA calculations performed for the iterative algorithm.

As shown in TABLE 1, only the second calculation (referred to as the FMA calculation in the sequence) and the third calculation (referred to as the multiplication calculation in the sequence) are used for the division calculation. Each calculation needs the output of the previous calculation. For example, in the case of the divisor reciprocal generation using Newton-Raphson, after generating $X_i$ in a redundant form in $i^{th}$ iteration, the non-redundant representation of B is used to calculate $2-B \times X_i$. The $2-B \times X_i$ is kept in a redundant form. In parallel, a carry propagate adder is used to get the non-redundant value of $X_i$. In the subsequent calculation, the redundant representation of $2-B \times X_i$ is multiplied by the non-redundant representation of $X_i$ to generate $X_{i+1}$ in a redundant form and the iteration repeats. Throughout this disclosure, the terms "calculation" and "operation" may be used interchangeably depending on the context.

TABLE 1

| Operation | Division | Square-root |
|---|---|---|
| Multiplication | — | $\frac{B}{2} \times X_i$ |
| FMA, Multiply & add | $2 - B \times X_i$ | $1.5 - \frac{B}{2} \times X_i^2$ |
| Multiplication | $X_i \times (2 - B \times X_i)$ | $X_i\left(1.5 - \frac{B}{2} \times X_i^2\right)$ |

Figure 1:
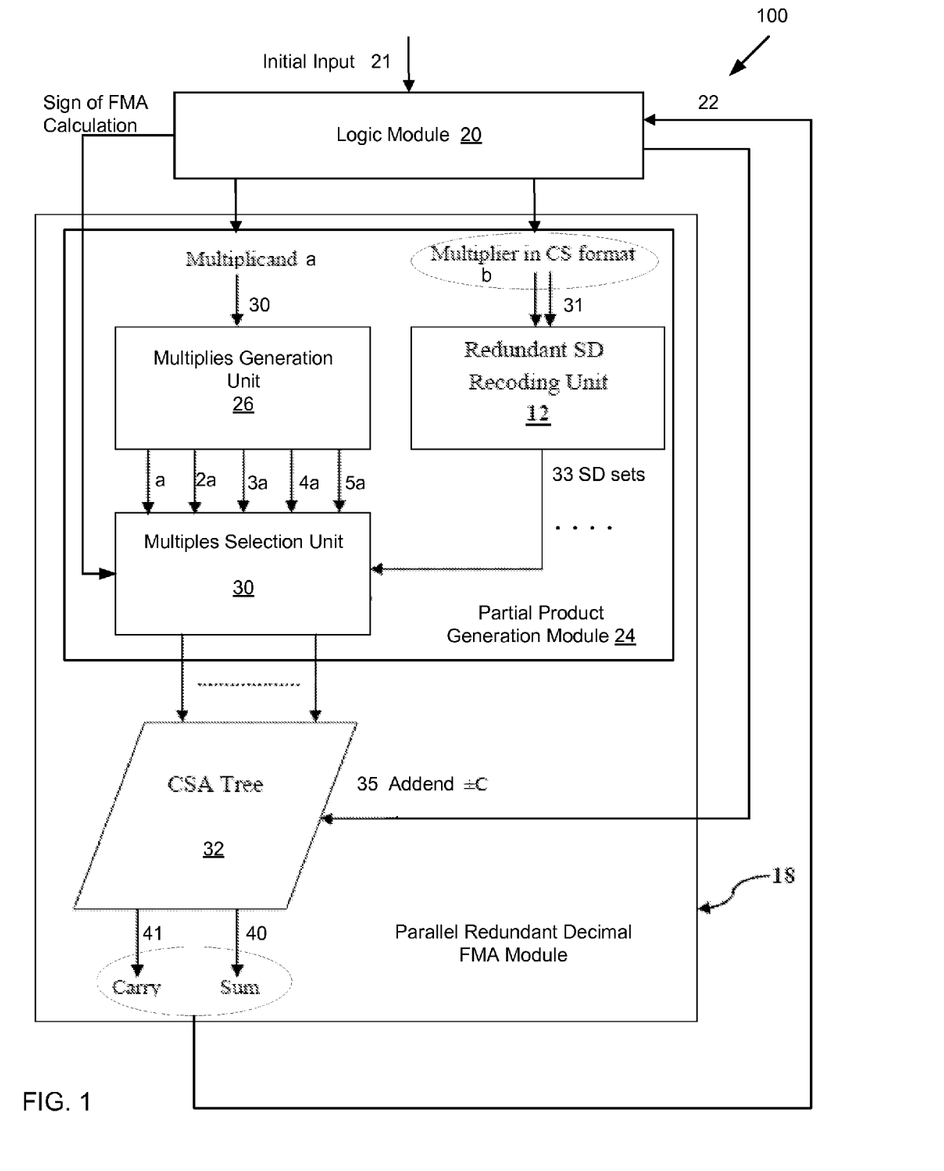
FIG. 1 shows a schematic diagram of a parallel redundant decimal fused-multiply-add (FMA) circuit configured to perform an iterative algorithm in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. For example, one or more of the modules and elements may be implemented in hardware, software, firmware, combinatorial logic circuit, pipelined logic circuit, or combinations thereof. Accordingly, embodiments of the invention should not be considered limited to the specific arrangements of modules shown in FIG. 1.

As shown in FIG. 1, the system (100) is configured to perform an iterative algorithm using a parallel redundant decimal FMA module (18) coupled to a logic module (20). In one or more embodiments, each of the FMA module (18) and the logic module (20), or a portion thereof, is implemented as a hardware circuit. In one or more embodiments of the invention, the parallel redundant decimal FMA module (18) is configured to perform decimal FMA calculations in the form a×b±c during each iteration of the iterative algorithm, where a, b, and ±c are variables representing the multiplicand (30), the multiplier (31), and the addend (35), respectively. In one or more embodiments, the multiplier (31) is in a carry save format (i.e., with a sum vector and a carry vector) to improve the delay of the calculation operation. However, the multiplicand (30) and the addend (35) are in a non-redundant form.

In one or more embodiments, the logic module (20) is configured to provide a value for a, b, and c and sign of FMA calculation based on the initial input (21) for a FMA calculation during an initial iteration of the iterative algorithm. For example, when calculating a divisor's reciprocal (i.e., 1/B) for the mathematical formula A/B, the logic module (20) is configured to provide an initial approximated reciprocal $X_0$ as the multiplier (31), a constant 2 as the addend (35), the parameter B and negative sign as the sign of FMA operation. Accordingly, the output (22) is calculated as $2-B \times X_0$ for the FMA calculation as shown in TABLE 1. The parameter B may have m binary coded decimal (BCD) digits while the initial approximated reciprocal $X_0$ may have n BCD digits resulting in the output (22) having m+n BCD digits for the FMA calculation in the initial iteration. In one or more embodiments, the output (22) has m+n BCD digits for each iteration of the iterative algorithm.

In one or more embodiments, the logic module (20) is configured to provide a value for a, b, c and sign of FMA calculation based on the result sum vector (40) and the result carry vector (41) for a FMA calculation during iterations of the iterative algorithm. For example, in the multiplication stage of the reciprocal divisor calculation, the logic module (20) may be configured to use $2-B \times X_0$ fed-back from the previous FMA calculation as the multiplier (31), a constant 0 as the addend (35), the initial approximated reciprocal $X_0$ as the multiplicand (30) and a positive sign as the sign of the FMA calculation. Accordingly, the output (22) at the end of the initial iteration, referred to as $X_1$ or the approximated reciprocal for the initial (i.e., first) iteration, is calculated as $X_1 = X_0 \times (2-B \times X_0)$. In one or more embodiments, the output (22) is in the CS format including the result sum vector (40) and the result carry vector (41). As noted above, calculation delay (e.g., through the logic module (20)) is reduced by configuring both the output (22) and the multiplier (31) in the CS format. In one or more embodiments, the logic module (20) maintains, for at least some iteration(s), the m+n BCD digit-width without truncation in the output (22) to provide the value b, in order to minimize cumulative truncation errors in executing the iterative algorithm.

In one or more embodiments of the invention, the parallel redundant decimal FMA module (18) includes a partial product generation module (24) and a carry save adder (CSA) tree (32). Further, the partial product generation module (24) includes a redundant signed digits (SD) recoding unit (12), a multiples generation unit (26), and a multiples selection unit (30): Although not specifically shown in FIG. 1, a final decimal carry propagation adder (CPA) may be used to convert the result sum vector (30) and the result carry vector (31) from the redundant format to a non-redundant format for the output (22). As described above, the configuration for performing iterative algorithms eliminates the use of CPA from the end of the FMA calculation to reduce the critical path delay. Hence, the output (22) is kept in the redundant form (i.e., CS format) and reused in the following iterations through the logic module (20).

In one or more embodiments, the multiples generation unit (26) is configured to generate multiples of the multiplicand (30) (denoted as a and has a m digit-width), such as a, 2a, 3a, 4a, and 5a that are collectively referred to as the multiples set {a, 2a, 3a, 4a, 5a}. In one or more embodiments, such multiples in the multiples set {a, 2a, 3a, 4a, 5a} are generated in parallel in BCD-4221 format. Although this specific example of a multiples set is depicted in FIG. 1 and described above, other types of multiples set may also be used with a variation of the SD recoding technique without deviating from the invention. More details regarding the generation of the multiples set are described in reference to FIG. 4 below.

In one or more embodiments, the redundant SD recoding unit (12) is configured to generate signed digits (SD) sets (33) from the m+n BCD digits in each of the multiplier sum vector and carry vector of the multiplier (31). The signed SD sets (33) include n+1 individual signed SD set with each set expressed by 6 bits. A signed digit set has an integer value between −5 and 5. Based on Table 2, the value of the recoded digit $SD_i$ depends on value of decimal digit $D_i$ and the previous digit ($D_{i-1}$). Hence n digit BCD input is recoded to n+1 SD sets. The extra SD set leads to an additional partial product. More details of generating the SD sets (33) are described in reference to FIGS. 2-4 below.

Figure 2:
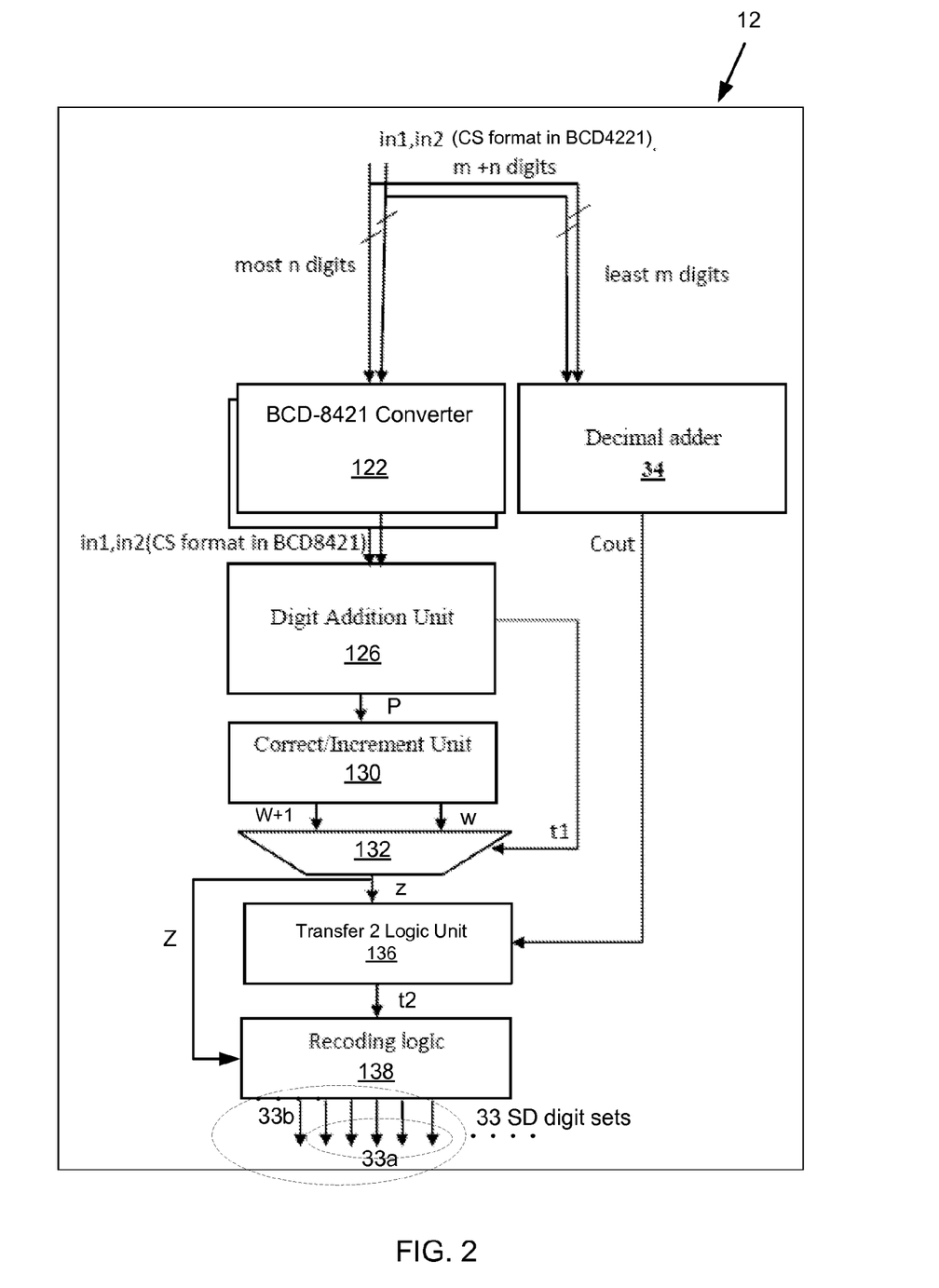
FIG. 2 shows a schematic diagram of a recoding unit in the parallel redundant decimal FMA circuit in accordance with one or more embodiments of the invention.

FIG. 2 shows a schematic diagram of the redundant SD recoding unit (12) of the parallel redundant decimal FMA module (18) in accordance with one or more embodiments of the invention. In one or more embodiments of the invention, one or more of the modules and elements shown in FIG. 2 may be omitted, repeated, and/or substituted. Accordingly, embodiments of the invention should not be considered limited to the specific arrangements of modules shown in FIG. 2.

As shown in FIG. 2, the redundant SD recoding unit (12) includes BCD-8421 converter (122), digit addition unit (126), correct/increment unit (130), multiplexer (132), transfer 2 logic unit (136), recoding logic (138), and decimal adder (34).

As noted above, based on the multiplicand (30) having m BCD digits and the initial value of the multiplier (31) having n BCD digits, the output (22) and the subsequent value of the multiplier (31), generated from the fed-back output (22) by the logic module (20), are in a m+n digit BCD-4221 CS format. In one or more embodiments, the redundant SD recoding unit (12) is configured to (i) add the most significant n digits of the multiplier sum vector (denoted as in1) and the most significant n digits of the multiplier carry vector (denoted as in2) digit by digit to generate an intermediate result z, (ii) add the least significant m digits of in1 and the least significant m digits of in2 to generate a carry bit Cout, and (iii) generate the SD sets (33) based on the intermediate result z and the carry bit Cout.

In one or more embodiments, the decimal adder unit (34) is configured to do decimal addition of the least m digits of in1 and the least m digits of in2. In one or more embodiments, the decimal adder unit (34) is a carry propagate adder (CPA) for generating the carry bit Cout of the decimal addition. Generally, the sum output is not used.

In one or more embodiments, the BCD-8421 converter (122) is configured to convert the most significant n digits of in1 and in2 into BCD-8421 format. These most n digits of i and in2 in BCD-8421 format are then added using the digit addition unit (126) in a digit by digit manner. In one or more embodiments, the digit addition unit (126) is configured to add an $i^{th}$ BCD-8421 digit in the most n digits of in1 and an $i^{th}$ BCD-8421 digit in the most n digits of in2 to generate an $i^{th}$ BCD-8421 digit in a position sum vector p having a carry bit assigned to the $(i+1)^{th}$ digit in a first transfer bit vector $t_1$. For example, adding 5 and 6 results in $P_i=11$, carry=$1=t_{1,i+1}$. In another example, adding 5 and 2 results in $P_i=7$, carry=$0=t_{1,i+1}$.

In one or more embodiments, the correct/increment unit (130) receives the digits in the position sum vector p to be corrected by mapping the input digits to be within the decimal numbers range {0 . . . 9} and generates an incremented version. The correction is done for the input range {A . . . F}, which is mapped into {0 . . . 5}. The outputs of the correct/increment unit (130) are the interim sum vector W and its incremented version W+1.

In one or more embodiments, the $i^{th}$ digit (limited to 1 or 0) in the first transfer bit vector $t_1$ is used to select, via the multiplexer (132), between the $i^{th}$ BCD-8421 digit $W_i$ in the interim sum vector w and an incremented version $W_i+1$ in W+1. The selected BCD-8421 digit is logically the same as adding $W_i$ and the $i^{th}$ digit (limited to 1 or 0) in the first transfer bit vector $t_1$ in digit by digit manner. The output of the multiplexer (132) is referred to as the intermediate result Z.

In one or more embodiments, the transfer 2 logic unit (136) determines the $(i+1)^{th}$ digit $t_{2,i+1}$ in the second transfer bit vector $t_2$ based on the $i^{th}$ digit $Z_i$ in the intermediate result Z and the effect of the carry bit Cout from the decimal adder (34). In one or more embodiments, the recoding logic (138) generates the SD sets (33) based on the intermediate result z and the second transfer bit vector $t_2$. The SD sets (33) includes n+1 individual SD set. The output of the recoding logic (138) is expressed in six selection lines for each of the n+1 individual SD sets. Five selection lines (33a) are used to select between the five generated multiples {a, 2a, 3a, 4a, 5a} of the multiplicand (30) in FIG. 1. The last selection line (33b) controls with the sign of FMA operation the sign of the selected multiple. For example, if the six selection lines representing an individual SD set are 100010 and positive FMA operation, −2a is selected from the multiple set {a, 2a, 3a, 4a, 5a} and if the six selection lines representing an individual SD set are 010000 and positive FMA operation, 5a is selected from the multiple set {a, 2a, 3a, 4a, 5a}. In one or more embodiments, the negative multiple is selected by performing nine's complement of the positive multiple. The nine's complement is incremented to ten's complement in a separate step using a tail digit. More details of determining the second transfer bit vector $t_2$ and generating the SD sets (33) are described in reference to FIG. 4 below.

Figure 3:
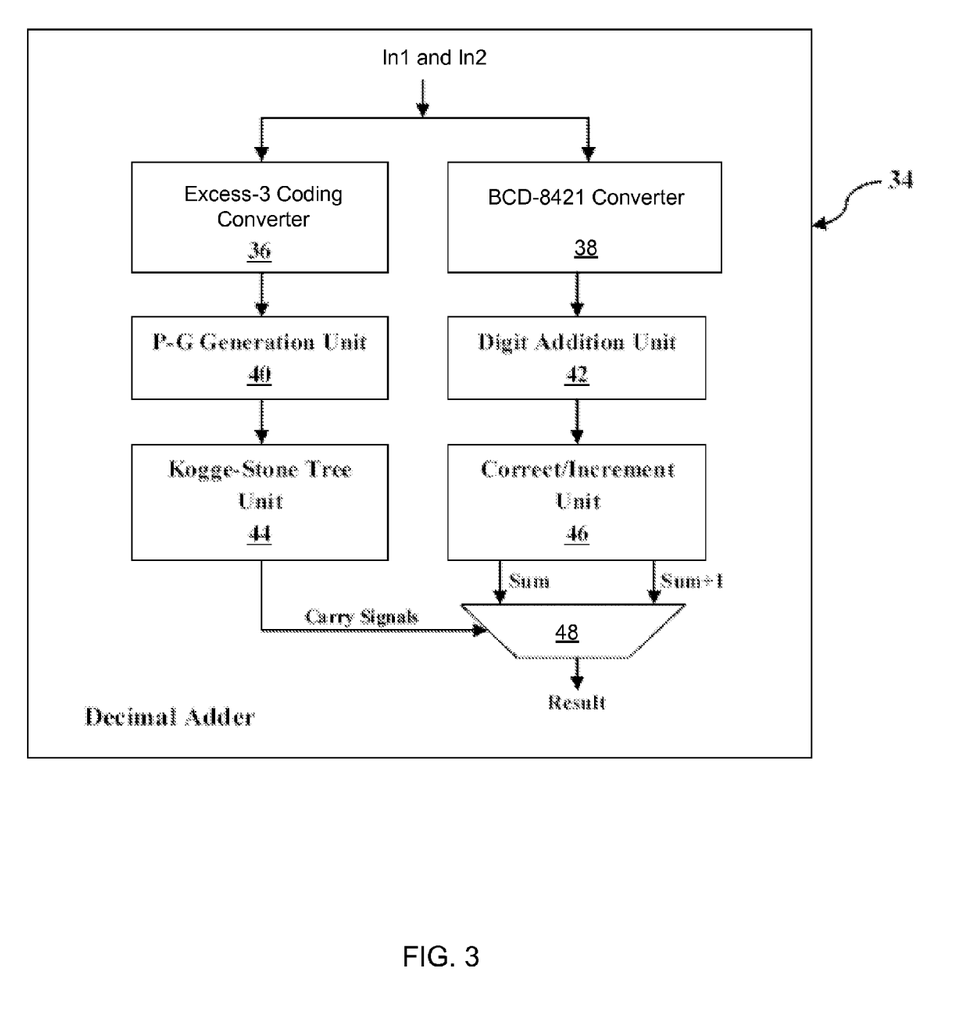
FIG. 3 shows a schematic diagram of a decimal carry propagation adder in the recoding unit of the parallel redundant decimal FMA circuit in accordance with one or more embodiments of the invention.

FIG. 3 shows a schematic diagram of the decimal adder (34) in the redundant SD recoding unit (12) of the parallel redundant decimal FMA module (18) in accordance with one or more embodiments of the invention. In one or more embodiments of the invention, one or more of the modules and elements shown in FIG. 3 may be omitted, repeated, and/or substituted. Accordingly, embodiments of the invention should not be considered limited to the specific arrangements of modules shown in FIG. 3.

As noted above, the redundant SD recoding unit (12) uses the decimal adder (34) to add the least m digits of the input multiplier sum vector in1 and carry vector in2. In one or more embodiments of the invention, the decimal adder (34) is a decimal carry propagation adder (CPA). In one or more embodiments, the decimal adder (34) has one path for digits summation and the other path for carry signals generation.

The digit summation path of the decimal adder (34) includes the BCD-8421 converter (38), the digit addition unit (42), the correct/increment unit (46), and the multiplexer (48). The BCD-8421 converter (38) receives and converts the input multiplier sum vector in1 and carry vector in2 into BCD-8421 coding type (i.e., format). The digit addition unit (42) adds the corresponding input digits without carry propagation. The correct/increment unit (46) receives the digits sum to be incremented and corrected by mapping the input digits to be in the decimal numbers range (0 . . . 9). The outputs of the correct/increment unit (46) are the digits sum (denoted as Sum) and its incremented version (denoted as Sum+1).

The carry signal path includes the excess-3 coding converter (36), the P-G generation unit (40), and the Kogge-Stone tree unit (44). The excess-3 coding converter (36) receives and converts input multiplier sum vector in1 and carry vector in2 into excess-3 coding type. The P-G generation unit (40) uses the characteristic of the excess-3 coding type to generate the propagate signal (P-signal) and generate signal (G-signal) without adding in1 and in2. Specifically, P-signal=a XOR b, G-signal=a AND b where a and b are inputs. Carry is propagated if P-signal is 1 and G-signal is 1. In decimal format, the G-signal is raised when the sum of the corresponding digits in the input operands is greater than 9 while the P-signal is raised when the sum equals 9.

The Kogge-Stone tree unit (44) receives the generated P-signal and G-signal and outputs the carry signals to select between the digits sum and its incremented version generated by the correct/increment unit (46). The most significant bit in the generated carry signals is used as the output carry Cout shown in FIG. 2. As noted above, Cout is used in calculating the signed digit set of the 1st digit of the most n digits.

Returning to the discussion of FIG. 1, in one or more embodiments of the invention, the partial product generation module (24) includes the multiples selection unit (30) that is configured to generate each of the partial product vectors from the multiples of the multiplicand (30) based on one of the n+1 individual SD set in the SD sets (33). As noted above, the selection between the generated multiples {a, 2a, 3a, 4a, 5a} of the multiplicand (30) is performed using the six selection lines representing each of the n+1 individual SD set. The Sign of FMA calculation XOR Sign bit of SDi calculates the effective sign, S, of the partial product. For Example, if Sign of FMA calculation and sign of SDi=1, effective sign of partial product is positive=0. Hence, the corresponding positive multiplicand multiple is selected. Each partial product $PP_i$ corresponds to an SD set $SD_i$. For a negative partial product generation, the positive partial product may be nine's complemented and a tail digit may be inserted in the next partial product $PP_{i+}1$ for proper ten's complement. In one or more embodiments, the generated partial products are in BCD-4221 format to facilitate the following reduction stage.

In one or more embodiments of the invention, the parallel redundant decimal FMA module (18) includes the carry save adder (CSA) tree (32) that is configured to add the partial product vectors and the addend (35) to generate the result sum vector (40) and the result carry vector (41). In one or more embodiments, the CSA tree (32) is a conventional CSA tree known to those skilled in the art.

Figure 4:
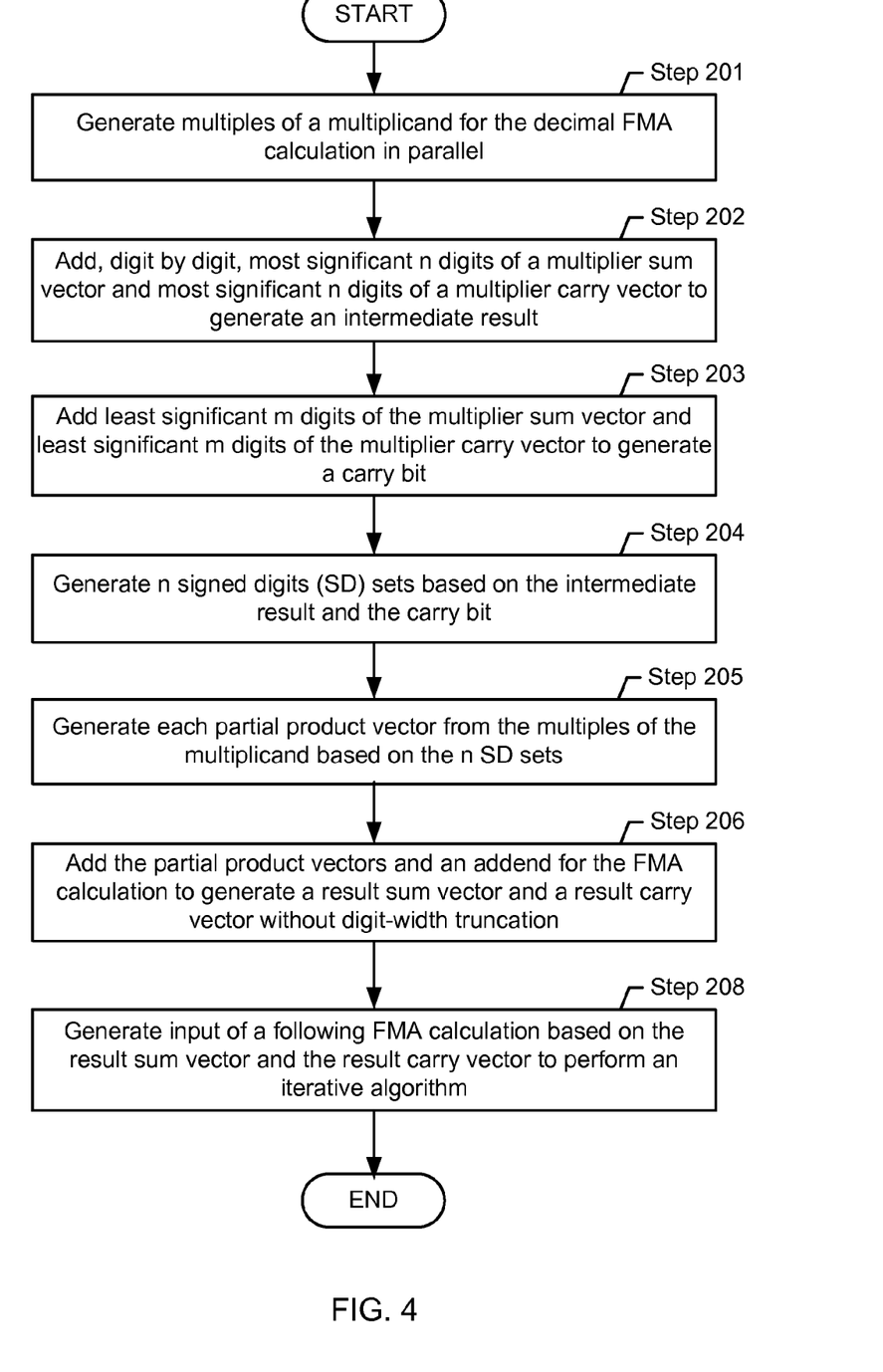
FIG. 4 shows a flowchart of a method for performing parallel redundant decimal FMA calculation in accordance with one or more embodiments of the invention.

FIG. 4 depicts a flowchart of a method for performing a fused-multiply-add (FMA) calculation in accordance with one or more embodiments of the invention. In one or more embodiments of the invention, one or more of the steps shown in FIG. 4 may be omitted, substituted, repeated, and/or performed in a different order. Accordingly, embodiments of the invention should not be considered limited to the specific arrangements of steps shown in FIG. 4. In one or more embodiments, the method described in reference to FIG. 4 may be practiced using the system (100) described in reference to FIG. 1 above.

Generally, the method depicted in FIG. 4 multiplies a multiplicand by a multiplier and add the result to an addend. In one or more embodiments of the invention, the input multiplier is in a redundant format, such as the carry save (CS) format having a sum vector and a carry vector, without the additional adder to add the sum vector and the carry vector in the critical path to reduce the delay of the calculation operation. However, the input multiplicand and addend are in a non-redundant form. In one or more embodiments, the addend is inserted as an input vector, in the form of a partial product vector, to be added to the partial product vectors, as generated during the multiplication, using a partial products reduction tree, such as a carry save adder tree.

To perform a multiplication a×b using conventional approach, where a is the multiplicand and b is the multiplier, the multiplicand multiples set {0, a, 2a, 3a, 4a, 5a, 6a, 7a, 8a, 9a} is generated where certain multiples are selected according to the multiplier digit to generate the partial products for further adjustment and reduction. In contrast to the conventional approach, in one or more embodiments, the signed digit radix-10 numbers are recoded from a redundant input format and used to speed up the generation of the multiples set {a, 2a, 3a, 4a, 5a} where certain multiples are then selected by signed-digit recoded multiplier digits as one or more of {−5a, −4a, −3a, −2a, −a, a, 2a, 3a, 4a, 5a}. Additionally, the multiplicand is recoded in the self-complementing BCD-4221 format to simplify both multiples generation and partial products reductions. Based on the self-complementing BCD-4221 format, decimal multiplicand multiples 2a, 4a, and 5a are obtained using simple logic, such as recoding and wired left shifts. The decimal multiplicand multiple 3a may be generated using a decimal adder. In one or more embodiments, the partial products are reduced by a carry save addition (CSA) tree based on BCD-4221 format. This reduces the reduction tree delay. No complex correction is needed for the CSA tree as the case in BCD-8421 addition. In one or more embodiments, a redundant SD-recoding algorithm is used to convert the input multiplier in carry save (CS) format into signed digit sets {−5 . . . 5} without converting the input multiplier into any intermediate non-redundant form.

As noted above, the multiples are selected by signed-digit recoded multiplier digits to generate partial products. The following equation in TABLE 2 represents the formulation for mapping the input multiplier digits $D_i$ to $SD_i$ in the signed-digit (SD) format. As shown in TABLE 2, $SD_i$ is generated based on value of decimal digit $D_i$ and the range of decimal digit $D_{i-1}$

TABLE 2

$$SD_i \begin{cases} D_i & D_i < 5 \ \& \ D_{i-1} < 5 \\ D_i + 1 & D_i < 5 \ \& \ D_{i-1} \geq 5 \\ -(10 - D_i) & D_i \geq 5 \ \& \ D_{i-1} < 5 \\ -(9 - D_i) & D_i \geq 5 \ \& \ D_{i-1} \geq 5 \end{cases}$$

| Current digit | Next Least significant Digit | SD |
|---|---|---|
| 0 | <5 | 0 |
| 0 | ≥5 | +1 |
| 1 | <5 | +1 |
| 1 | ≥5 | +2 |
| 2 | <5 | +2 |
| 2 | ≥5 | +3 |
| 3 | <5 | +3 |
| 3 | ≥5 | +4 |
| 4 | <5 | +4 |
| 4 | ≥5 | +5 |
| 5 | <5 | −5 |
| 5 | ≥5 | −4 |
| 6 | <5 | −4 |
| 6 | ≥5 | −3 |
| 7 | <5 | −3 |
| 7 | ≥5 | −2 |
| 8 | <5 | −2 |
| 8 | ≥5 | −1 |
| 9 | <5 | −1 |
| 9 | ≥5 | 0 |

In one or embodiments, an algorithm that maps the input multiplier into the SD format {−5 . . . 5} without converting to any intermediate non-redundant form is used. Such algorithm is described below.

Let $S_i \in [0, 9]$ and $C_i \in [0, 9]$ denotes the input multiplier sum digit and carry digit, respectively. Define the position sum vector P having digit $P_i$ as below.

$$P_i = S_i + C_i$$

Define the interim sum vector W having digit $W_i$ and intermediate result vector Z having digit $Z_i$ as below.

$$W_i = P_i - 10t_{1,i+1} \text{ where } t_{1,i+1} = \begin{cases} 0 & 0 \leq P_i \leq 9 \\ 1 & 9 < P_i \leq 18 \end{cases}$$

$$Z_i = W_i + t_{1,i} \text{ then, } Z_i \in [0, 10]$$

Therefore, the $i^{th}$ SD set $SD_i$ in the SD sets having n+1 individual SD set can be expressed as below.

$$SD_i = t_{2,i} + Z_i - 10t_{2,i+1} \text{ where } t_{2,i+1} = \begin{cases} 0 & 0 \leq Z_i \leq 4 \\ 1 & 4 < Z_i \leq 10 \end{cases}$$

In one or more embodiments, $SD_i$ is expressed using 5 bits (in a one-hot code) which controls the selection of multiples set as well as a sign bit which controls the sign of the selected multiple. These 6 bits are collectively referred to as the SD set.

TABLE 3 below shows the SD recoding of an example multiplier sum vector in1 and carry vector in2 from BCD-4221 format to the SD set.

TABLE 3

| 8 E C | In1 in BCD4221 |
|---|---|
| 2 A 9 | In2 in BCD4221 |
| 4 8 6 | In1 in BCD8421 |
| 2 6 5 | In2 in BCD8421 |
| 6 4 1 | W |
| 0 1 1 0 | t1 |
| 0 7 5 1 | Z |
| 1 1 0 0 | t2 |
| 1 2̄ 5̄ 1 | SD |

Generally, a redundant decimal multiplication (or more generally, a FMA calculation) using a m-digit wide multiplicand and a n-digit wide multiplier results in a (m+n)-digit wide result. If the result is truncated to n digits before being used to generate a new multiplier input for a following multiplication (or more generally, a FMA calculation) to perform an iterative algorithm, the most n-digit truncation may not take into account the effect of carry propagation from the least m digits in the (m+n)-digit wide result.

The following example in TABLE 4 for a 5×2 digits decimal multiplication in BCD-8421 format illustrates how the previous equation for $SD_i$ may not estimate the effect of propagation correctly.

TABLE 4

| Non redundant representation | | 32.99998 | | 33.00003 |
|---|---|---|---|---|
| Redundant Representation | No propagation | S = 11.12722 C = 21.87276 | propagation | 11.12782 21.87221 |
| P | | 32.99998 | | 32.999A3 |
| T1 | | 00.00000 | | 00.00100 |
| W | | 32.99998 | | 32.99903 |
| Z | | 32.99998 | | 32.99A03 |
| T2 | | 01.11110 | | 01.11000 |
| SD | | 33.xxx Not correct | | 33.xxx Correct |

As shown in TABLE 4, both numbers in left and right columns will round into 033 after truncations, 0 not shown in the table. However, the first number on the left is incorrectly estimated because it should be 032 as no propagation occurs. Therefore, the previous equation for $SD_i$ is only valid for the most n digits of the input n+m BCD digits where an improved equation for $SD_0$ is given below.

$$SD_0 = Cin0 + Z_0 - 10t_{2,1} \text{ where } t_{2,1} = \begin{cases} 0 & 0 \leq Z_0 \leq 4 \\ 1 & 4 < Z_0 \leq 10 \end{cases}$$

In this equation, Cin0 is the output carry result from adding the least m digits in the multiplier sum vector and the least m digits in the multiplier carry vector. The method steps depicted in FIG. 4 implement this improved equation for $SD_0$ among other equations described above.

Returning to the discussion of the flow chart shown in FIG. 2, initially in Step 201, multiples of a multiplicand for the decimal FMA calculation are generated in parallel. In one or more embodiments, the input multiplicand and the input addend are in BCD-8421, BCD-4221 non-redundant format respectively, while the input multiplier is in BCD-4221 CS format. In general, the critical delay path of the multiples generation is for generating the odd multiples (e.g., 3a), which waits for the generation of the multiple 2a before adding to a using a decimal carry propagation adder. In one or more embodiments, another fast technique is used to generate the multiple 3a that multiplies each digit of the input multiplicand by 3 and formulates the result in CS format and using a few level of logic to add the CS format.

In one or more embodiments of the invention, the multiplicand has m BCD digits and an initial value of the multiplier has n BCD digits resulting in the FMA calculation output in a m+n digit BCD-4221 CS format. In one or more embodiments, the subsequent value of the multiplier in a subsequent FMA calculation is generated from the previous FMA calculation output without digit-width truncation. Therefore, the subsequent value of the multiplier is also in the m+n digit BCD-4221 CS format having a m+n digit multiplier sum vector and a m+n digit multiplier carry vector. Such embodiments are described in reference to Step 208 below. In one or more embodiments, these multiplicand multiples are generated using the partial product generation module (24) described in reference to FIG. 1 above. For example, the multiples generation unit (26) described in reference to FIG. 1 above may be used.

In Steps 202-204, signed digits (SD) sets are generated from the m+n BCD digits in each of the multiplier sum vector and carry vector of the multiplier. In one or more embodiments, the signed SD sets includes n+1 individual signed SD set (e.g., $SD_i$ described above) each having 6 signed digits. As noted above, the signed digit has an integer value between −5 and 5.

In Step 202, the most significant n digits of a multiplier sum vector and the most significant n digits of a multiplier carry vector are added to generate an intermediate result. In one or more embodiments, this addition is performed using the partial product generation module (24) described in reference to FIG. 1 above. For example, the redundant SD recoding unit (12) described in reference to FIG. 2 above may be used.

In Step 203, the least significant m digits of the multiplier sum vector and the least significant m digits of the multiplier carry vector are added to generate a carry bit. In one or more embodiments, this carry bit is the Cin0 in the improved equation for $SD_0$ described above. In one or more embodiments, this addition is performed using the partial product generation module (24) described in reference to FIG. 1 above. For example, the redundant SD recoding unit (12) described in reference to FIG. 2 above may be used. Specifically, the decimal adder (34) may be used where the output Cout of the decimal adder (34) is the carry bit Cin0.

In Step 204, n+1 signed digits (SD) sets are generated based on the intermediate result and the carry bit Cin0. In one or more embodiments, these SD sets are generated using the partial product generation module (24) described in reference to FIG. 1 above. For example, the redundant SD recoding unit (12) described in reference to FIG. 2 above may be used.

In Step 205, each partial product vector is generated from the multiples of the multiplicand based on one of the n+1 SD sets. As noted above, a tail digit is inserted in the next $PP_{i+1}$ if the current $PP_i$ is negative (i.e. nine complemented and corresponds to a negative multiple) to get the ten's complement. In one or more embodiments, these partial product vector are generated using the partial product generation module (24) described in reference to FIG. 1 above. For example, the multiples selection unit (30) described in reference to FIG. 1 above may be used.

In Step 206, the partial product vectors and an addend for the FMA calculation are added to generate a result sum vector and a result carry vector. In one or more embodiments, this addition is performed using the carry save adder tree (32) described in reference to FIG. 1 above.

In Step 208, input of another FMA calculation, following Steps 201-206, is generated based on the result sum vector and the result carry vector to perform an iterative algorithm. In one or more embodiments, the input of the following FMA calculation is generated using the logic module (20) described in reference to FIG. 1 above.

TABLE 5 shows an example iterative Newton Raphson algorithm to calculate the quotient A/B using inputs in non-redundant format where m=n=18. The decimal point in each fixed point integer is a virtual point. The term "iteration" in TABLE 5 refers to individual FMA calculation in the sequence of operations shown in FIG. 1 above. As shown in TABLE 5, the generated CSA addition results are truncated to the most significant 18 digits when they are fed-back to the next FMA calculation. The redundant result $2-b \times X_0$ is shown in TABLE 6 where a carry propagation form the least m digits to the most n digits is highlighted by a curved arrow. This carry propagation effect is addressed in the method depicted in FIG. 4 and illustrated in TABLE 7 below. As shown in TABLE 7, SD sets include 19 individual SD set where each SD set has six control lines as one-hot code. The terms in1, in2, W, T1, Z, T2, and SD shown in TABLE 1 refer to the same terms used in FIG. 2 and TABLE 3 above. Throughout this disclosure in1 and In1 are used interchangeably while in2 and In2 are used interchangeably.

TABLE 5

| Description | A(dividend) = 0.989534070245. B(divisor) = 0.999828910889444. X0 = 1.000171. m = n = 18 | | |
|---|---|---|---|
| Operation | | After truncation the most n digits ready for further operation | The output from multiplication/FMA operation |
| 1st Iteration | 2−bxX₀ | 1.00000011836679390 | 1.000000118366793905076 |
| 2nd iteration | X1 = X0x(2−bxX₀) | 1.00017111838703462 | 1.0001711183870346217569 |
| 3rd iteration | 2−bxX₁ | 1.00000000000001401 | 1.000000000000001401753049817944872 |
| 4th iteration | X₂ = X₀x(2−bxX₁) | 1.00017111838704863 | 1.00017111838704863239736860235502620 |
| 5th iteration | Q =X₂xA | 0.989703977190299901 | 989703977190299901366510143 |

TABLE 6

| Redundant form in BCD 4221 | Sum | BFE20E139DF9F9D91C0A0082000080E80808 |
|---|---|---|
| | Carry | CF9F9204FD77541830F5263F5FF9BFFFF9F4 |
| Non redundant form in BCD8421 | Result | 1000000118366793905076000000000000000 |
| | | Most n digits |

TABLE 7

| In1 · In2 in BCD4221 | 80808BFE20E139DF9F9D91C0A0082000080E CF9F9204FD77541830F5263F5FF9BFFFF9F4 | | |
|---|---|---|---|
| | Most n digits | | Least m digits |
| | 80808BFE20E139DF9F | | 9D91C0A0082000080E |
| | CF9F9204FD77541830 | | F5263F5FF9BFFFF9F4 |

| In1·In2 in BCD8421 (most n digits) | 4 | 0 | 4 | 0 | 4 | 7 | 9 | 8 | 2 | 0 | 8 | 1 | 3 | 5 | 7 | 9 | 5 | 9 | 5 | 0 | 7 | 6 | 0 | 0 | 0 | 0 | 0 | 0 | 0 | 0 | 0 | 0 | 0 | 0 | 0 | Decimal addition = 1 |
|---|---|---|---|---|---|---|---|---|---|---|---|---|---|---|---|---|---|---|---|---|---|---|---|---|---|---|---|---|---|---|---|---|---|---|---|---|
| | 6 | 9 | 5 | 9 | 5 | 2 | 0 | 2 | 9 | 7 | 5 | 5 | 3 | 2 | 1 | 4 | 3 | 0 | 1 | | | | | | | | | | | | | | | | | Cout = Cin0 = t₂,₀ |
| W | 0 | 9 | 9 | 9 | 9 | 9 | 9 | 0 | 1 | 7 | 3 | 6 | 6 | 7 | 8 | 3 | 8 | 9 | | | | | | | | | | | | | | | | | | |
| T₁ | 0 | 0 | 0 | 0 | 0 | 0 | 0 | 1 | 1 | 0 | 1 | 0 | 0 | 0 | 0 | 1 | 0 | 0 | 0 | | | | | | | | | | | | | | | | | |
| Z | 0 | 0 | 9 | 9 | 9 | 9 | 9 | A | 1 | 1 | 8 | 3 | 6 | 6 | 7 | 9 | 3 | 8 | 9 | | | | | | | | | | | | | | | | | |
| T2 | 0 | 1 | 1 | 1 | 1 | 1 | 1 | 0 | 0 | 1 | 0 | 1 | 1 | 1 | 1 | 0 | 1 | 1 | 1 | | | | | | | | | | | | | | | | | |
| SD | 0 | 1 | 0 | 0 | 0 | 0 | 0 | 0 | 1 | 2 | 2 | 4 | 3 | 3 | 2 | 1 | 4 | 1 | 0 | | | | | | | | | | | | | | | | | |

As is known by one skilled in the art, this invention, including any logic circuit or transistor circuit, may be modeled, generated, or both by a computer based on a description of the hardware expressed in the syntax and the semantics of a hardware description language (HDL). Such HDL descriptions are often stored on a computer readable medium. Applicable HDLs include those at the layout, circuit netlist, register transfer, and/or schematic capture levels. Examples of HDLs include, but are not limited to: GDS II and OASIS (layout level); various SPICE languages, and IBIS (circuit netlist level); Verilog and VHDL (register transfer level); and Virtuoso custom design language and Design Architecture-IC custom design language (schematic capture level). HDL descriptions may also be used for a variety of purposes, including but not limited to layout, behavior, logic and circuit design verification, modeling, and/or simulation.

The system(s) and processes described in this detailed description may be used in any application requiring decimal calculations, including (but not limited to) applications of: finance, taxation, investments, transportation, commerce, energy consumption, energy pricing/purchasing, etc.

Figure 5:
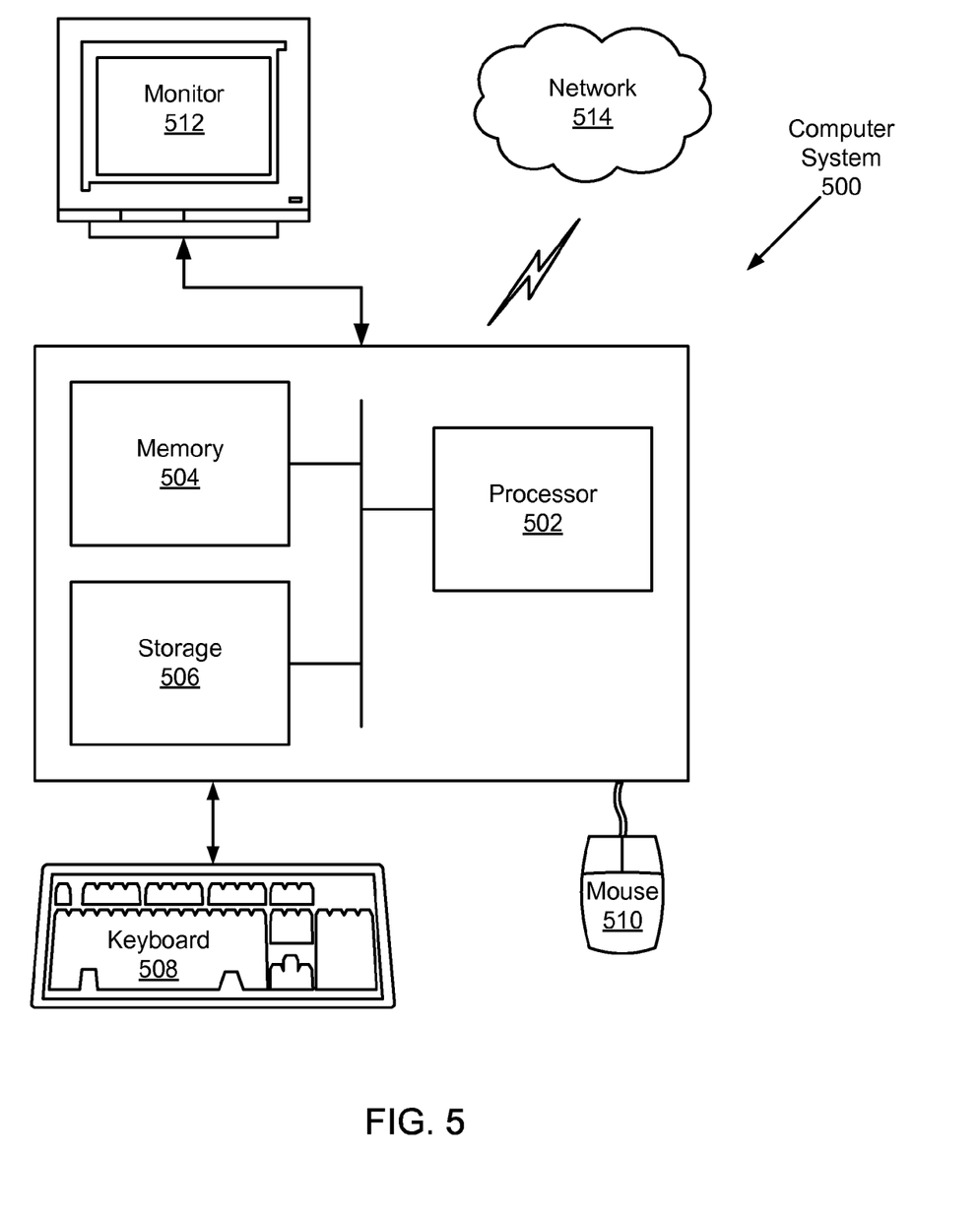
FIG. 5 shows a diagram of a computer in accordance with one or more embodiments of the invention.

Embodiments of the invention may be implemented on virtually any type of computer regardless of the platform being used. For example, as shown in FIG. 5, a computer system (500) includes one or more processor(s) (502) such as a central processing unit (CPU), non-transitory computer-readable medium, or other hardware processor, associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor ((512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various elements of the AAD platform (122), the repository (125), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A circuit for performing a decimal fused-multiply-add (FMA) calculation, comprising:
    a partial product generation module comprising:
        a multiples generator unit configured to generate a plurality of multiples of a multiplicand for the decimal FMA calculation, wherein the multiplicand is in a m digit binary coded decimal (BCD) format;
        a recoding unit configured to generate n+1 signed digits (SD) sets from a multiplier sum vector and a multiplier carry vector of a multiplier for the decimal FMA calculation; and
        a multiples selection unit configured to generate a plurality of partial product vectors from the plurality of multiples of the multiplicand based on the n+1 SD sets and a sign of the FMA calculation; and
    a carry save adder (CSA) tree coupled to the partial product generation unit and configured to add the plurality of partial product vectors and an addend for the FMA calculation to generate a result sum vector and a result carry vector in a m+n digit BCD format,
    wherein m and n are integers, and
    wherein the FMA calculation comprises a calculation of a×b±c, where a represents the multiplicand, b represents the multiplier, c represents the addend, × represents a multiplication operator, and ± represents one of an addition operator and a subtraction operator.

2. The circuit of claim 1, wherein the multiplier sum vector, the multiplier carry vector, the result sum vector, and the result carry vector are in a m+n digit BCD format, wherein the recoding unit is further configured to:
    add most significant n digits of the multiplier sum vector and most significant n digits of the multiplier carry vector in a digit by digit manner to generate an intermediate result; and
    add least significant m digits of the multiplier sum vector and least significant m digits of the multiplier carry vector to generate a carry bit,
    wherein the n+1 signed digits (SD) sets are generated based on the intermediate result and the carry bit.

3. The circuit of claim 1, wherein m =n and the addend is in the m bit BCD format.

4. The circuit of claim 1,
    wherein the recoding unit is further configured to convert a signed digits (SD) set into a one-hot code; and
    wherein the multiples selection unit is further configured to generate the plurality of partial product vectors from the plurality of multiples of the multiplicand based on the one-hot code.

5. The circuit of claim 1, further comprising:
    a logic module coupled to the partial product generation unit and the CSA tree, wherein the logic module is configured to:
        provide a first value for at least one of a, b, and c during a first iteration of a plurality of iterations of the FMA calculation, wherein the first value is extracted from a mathematical formula that is computed by the plurality of sequences of the FMA calculation; and
        provide a second value for at least one of a, b, and c during a second iteration of the plurality of iterations of the FMA calculation, wherein the second value is based on the result sum vector and the result carry vector from the first iteration.

6. The circuit of claim 5, wherein the plurality of iterations of the FMA calculation is a part of Newton-Raphson approximation.

7. The circuit of claim 6, wherein the mathematical formula comprises at least one selected from a group consisting of a division calculation formula and a square root calculation formula.

8. A method for performing a floating-point fused-multiply-add (FMA) calculation, comprising:
    generating, by circuitry, a plurality of multiples of a multiplicand for the decimal FMA calculation, wherein the multiplicand is in a m digit binary coded decimal (BCD) format;
    generating, by circuitry, n+1 signed digits (SD) sets from a multiplier sum vector and a multiplier carry vector of a multiplier for the decimal FMA calculation;
    generating, by circuitry, a plurality of partial product vectors from the plurality of multiples of the multiplicand based on the n+1 SD sets and a sign of the FMA calculation; and
    adding the plurality of partial product vectors and an addend for the FMA calculation to generate a result sum vector and a result carry vector in a m+n digit BCD format,
    wherein m and n are integers, and
    wherein the FMA calculation comprises a calculation of a×b±c, where a represents the multiplicand, b represents the multiplier, c represents the addend, × represents a multiplication operator, and ± represents one of an addition operator and a subtraction operator.

9. The method of claim 8, wherein the multiplier sum vector, the multiplier carry vector, the result sum vector, and the result carry vector are in a m+n digit BCD format, the method further comprising:
    adding most significant n digits of the multiplier sum vector and most significant n digits of the multiplier carry vector in a digit by digit manner to generate an intermediate result; and
    adding least significant m digits of the multiplier sum vector and least significant m digits of the multiplier carry vector to generate a carry bit,
    wherein the n+1 signed digits (SD) sets are generated based on the intermediate result and the carry bit.

10. The method of claim 8, wherein m=n and the addend is in the m bit BCD format.

11. The method of claim 8, further comprising:
    converting a signed digits (SD) set into a one-hot code; and
    generating the plurality of partial product vectors from the plurality of multiples of the multiplicand based on the one-hot code.

12. The method of claim 8, further comprising:
    providing a first value for at least one of a, b, and c during a first iteration of a plurality of iterations of the FMA calculation, wherein the first value is extracted from a mathematical formula that is computed by the plurality of sequences of the FMA calculation; and providing a second value for at least one of a, b, and c during a second iteration of the plurality of iterations of the FMA calculation, wherein the second value is based on the result sum vector and the result carry vector from the first iteration.

13. The method of claim 12, wherein the plurality of iterations of the FMA calculation is a part of Newton-Raphson approximation.

14. The method of claim 13, wherein the mathematical formula comprises at least one selected from a group consisting of a division calculation formula and a square root calculation formula.

15. A non-transitory computer-readable medium storing a description expressed in a hardware description language which is interpreted by a computer to specify a circuit comprising:

a partial product generation module comprising:
   a multiples generator unit configured to generate a plurality of multiples of a multiplicand for the decimal FMA calculation, wherein the multiplicand is in a m digit binary coded decimal (BCD) format;
   a recoding unit configured to generate n+1 signed digits (SD) sets from a multiplier sum vector and a multiplier carry vector of a multiplier for the decimal FMA calculation; and
   a multiples selection unit configured to generate a plurality of partial product vectors from the plurality of multiples of the multiplicand based on the n+1 SD sets and a sign of the FMA calculation; and a carry save adder (CSA) tree coupled to the partial product generation unit and configured to add the plurality of partial product vectors and an addend for the FMA calculation to generate a result sum vector and a result carry vector in a m+n digit BCD format, wherein m and n are integers, and wherein the FMA calculation comprises a calculation of a×b±c, where a represents the multiplicand, b represents the multiplier, c represents the addend, × represents a multiplication operator, and ± represents one of an addition operator and a subtraction operator.

16. The non-transitory computer-readable medium of claim 15, wherein the multiplier sum vector, the multiplier carry vector, the result sum vector, and the result carry vector are in a m+n digit BCD format, wherein the recoding unit is further configured to:

add most significant n digits of the multiplier sum vector and most significant n digits of the multiplier carry vector in a digit by digit manner to generate an intermediate result; and add least significant m digits of the multiplier sum vector and least significant m digits of the multiplier carry vector to generate a carry bit, wherein the n+1 signed digits (SD) sets are generated based on the intermediate result and the carry bit.

17. The non-transitory computer-readable medium of claim 15, wherein m=n and the addend is in the m bit BCD format.

18. The non-transitory computer-readable medium of claim 15, wherein the recoding unit is further configured to convert a signed digits (SD) set into a one-hot code; and wherein the multiples selection unit is further configured to generate at least one of the plurality of partial product vectors from the plurality of multiples of the multiplicand based on the one-hot code.

19. The non-transitory computer-readable medium of claim 15, the circuit further comprising:

a logic module coupled to the partial product generation unit and the CSA tree, wherein the logic module is configured to:

provide a first value for at least one of a, b, and c during a first iteration of a plurality of iterations of the FMA calculation, wherein the first value is extracted from a mathematical formula that is computed by the plurality of sequences of the FMA calculation; and provide a second value for at least one of a, b, and c during a second iteration of the plurality of iterations of the FMA calculation, wherein the second value is based on the result sum vector and the result carry vector from the first iteration.

20. The non-transitory computer-readable medium of claim 19, wherein the plurality of iterations of the FMA calculation is a part of Newton-Raphson approximation.

* * * * *